J. EACHUS.

Process of Cutting Wet Paper.

No. 6,315. Reissued March 2, 1875.

WITNESSES

George E. Upham

E. H. Bates

BY

INVENTOR

James Eachus

Chipman & Fosmer & Co

ATTORNEYS

THE GRAPHIC CO. PHOTO-LITH. 39 & 41 PARK PLACE, N.Y.

UNITED STATES PATENT OFFICE.

JAMES EACHUS, OF COATESVILLE, PENNSYLVANIA.

IMPROVEMENT IN PROCESSES OF CUTTING WET PAPER.

Specification forming part of Letters Patent No. 142,154, dated August 26, 1873; reissue No. 6,315, dated March 2, 1875; application filed May 9, 1874.

*To all whom it may concern:*

Be it known that I, JAMES EACHUS, of Coatesville, in the county of Chester and State of Pennsylvania, have invented a new and Improved Process of Cutting Paper Boards, of which the following is a description, reference being had to the accompanying drawings, in which—

Figure 3:
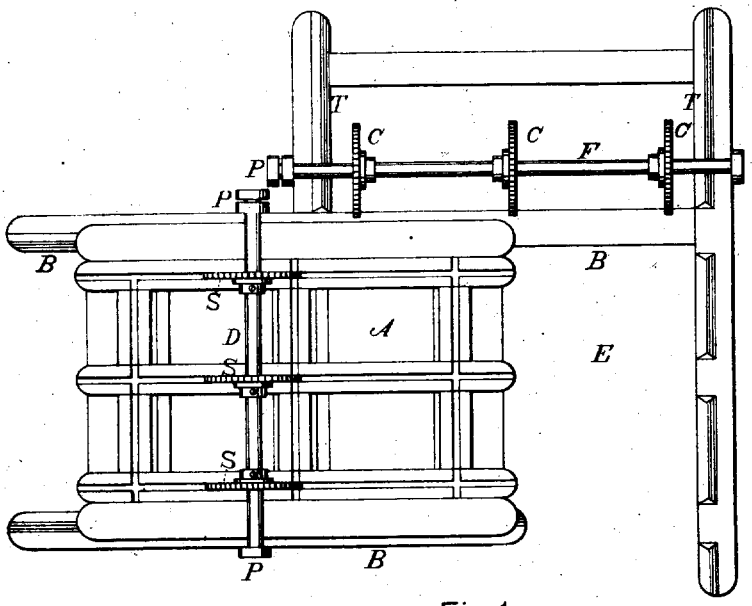
Figure 1:
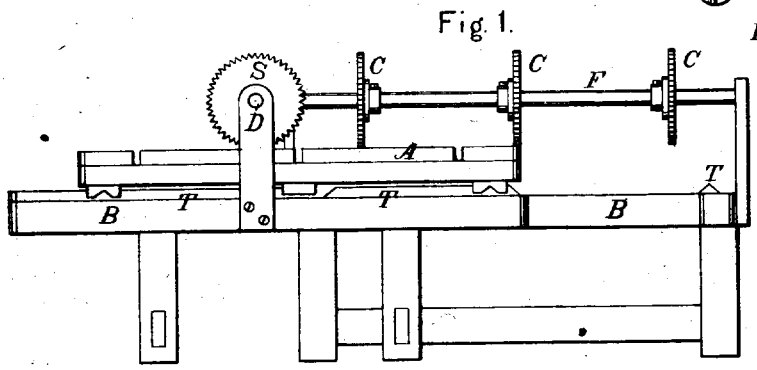
Figure 4:
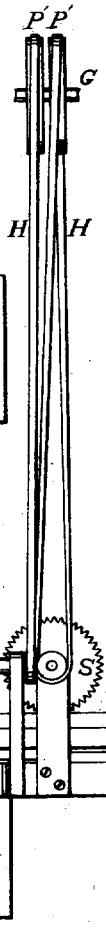
Figure 4:
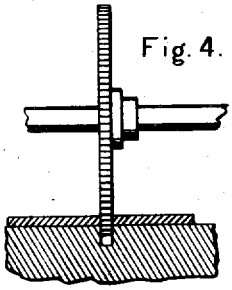
Figure 2:
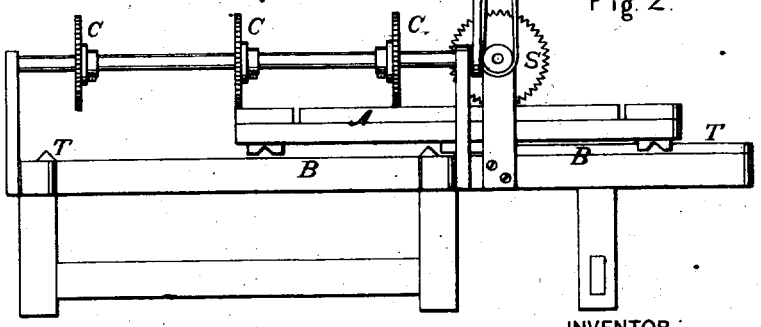

Figure 1 is a front view of a machine for conducting my process. Fig. 2 is a side elevation of such machine. Fig. 3 is a top view, and Fig. 4 is a detail of a saw in the act of cutting.

Similar letters of reference indicate corresponding parts in the several figures.

The object of this invention is to trim and cut heavy paper used in the manufacture of boxes and books; and it consists in subjecting the paper while in a wet state, as it is taken from the paper-making machine, to the action of circular cutters having serrated edges, whereby the sheets are cut evenly and economically, and the trimmings can be returned to the paper-machine without regrinding or other treatment.

In the annexed drawings, I have represented one practical form of a machine for conducting my process; but I desire to be understood as not confining myself to the precise construction of such machine, nor to the number of serrated cutters shown.

In Fig. 3, E designates the frame, which should be strongly constructed. B B and T T are guides on frame E. A is a two-way carriage, which is constructed in such manner as to play freely on the guides B B and T T. D and F are saw-shafts, which are mounted upon adjustable bearings bolted to frame E. C C and S S S are circular saws or cutters, having serrated edges, adapted for the purpose intended, which saws are secured upon shafts D and F by adjustable collars.

For the purpose of operating this machine, shafts D and F are provided with pulleys P P. Motion is communicated by belts H H, Fig. 2, from a shaft, G, on which are pulleys P′ P′.

The paper to be cut is put upon the carriage A. The pile is composed of a number of large sheets as they are taken from the paper-making machine in a very wet condition. The carriage is then drawn upon the guides B B, saws S S S cutting through the paper; thence at right angles to the first direction upon guides T T, saws C C C cutting through the pile in the new direction, the result of the operation being to trim the edges of the sheets and cut each sheet into four parts.

The saws can be adjusted on shafts D and F, so as to trim and cut the sheets any desired size.

It will be seen from the above description that I take sheets of paper, while they are in a wet condition, directly from the paper-making machine, and pass the saws over them, thereby trimming their edges, and leaving them of an equal thickness throughout, and dividing them into smaller sheets. This process of sawing cannot be performed successfully and without tearing the surfaces of the sheets unless the sheets are wet, and in the condition in which they leave the paper-making machine.

I make no claim to the arrangement of circular saws and carriages for the purpose of sawing logs or any kind of wood; nor do I broadly claim the machine herein described for sawing wood.

I am aware that paper board has heretofore been sawed when in a dry state, and I therefore lay no claim to such invention, which leaves the edges of the paper thus sawed in a jagged condition, the action of the saw-teeth tending to separate the fibers of the paper board in the line of the kerf; whereas when the paper board is sawed in a wet state, directly after leaving the paper-machine, the edges are left smooth, the saws causing an interlocking of the fibers in its path through the paper, and the trimmings of the paper being in a condition to be returned to the vat without regrinding, which would not be the case with trimmings of paper board sawed in a dry state.

What I claim as new, and desire to secure by Letters Patent, is—

The process of sawing paper board as herein described, consisting in sawing the paper board while it is in the wet state in which it is taken from the paper-making machine, substantially as described, and for the purpose set forth.

In testimony that I claim the above I have hereunto subscribed my name in the presence of two witnesses.

JAMES EACHUS.

Witnesses:
GEORGE E. UPHAM,
F. J. MASI.